Feb. 28, 1967 J. P. REEVES 3,306,218
METHOD OF AND APPARATUS FOR ELEVATING LIQUIDS AND SEMI-LIQUIDS
Filed Sept. 13, 1965
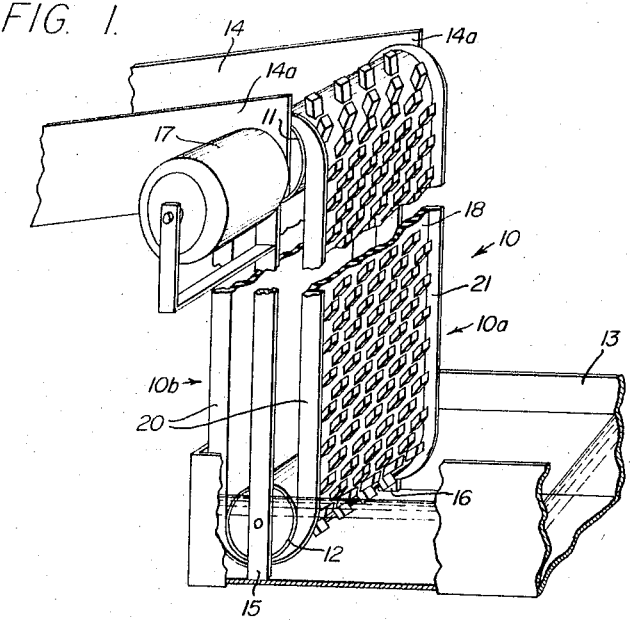
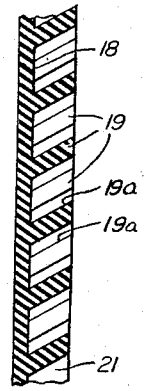
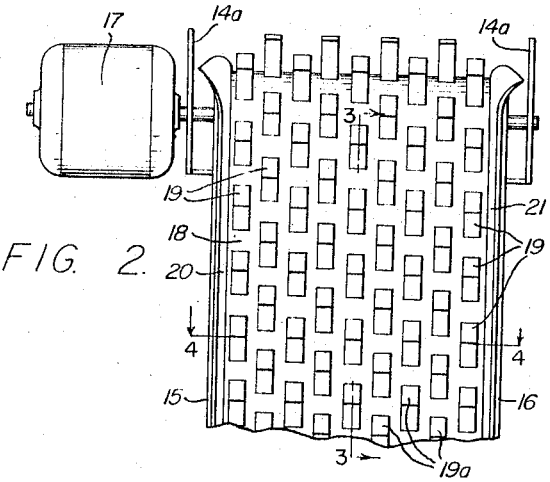
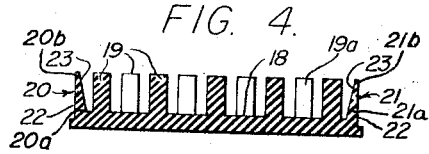
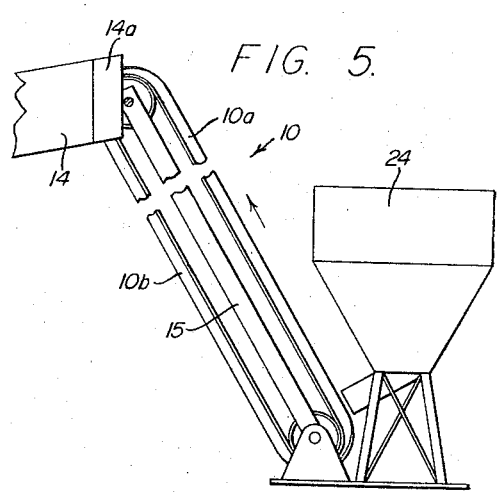
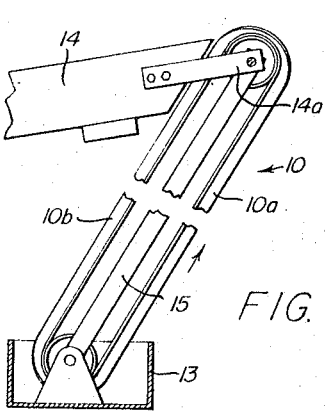
INVENTOR.
JOHN P. REEVES
BY Mallinckrodt and Mallinckrodt
ATTORNEYS United States Patent Office 3,306,218
Patented Feb. 28, 1967

3,306,218
METHOD OF AND APPARATUS FOR ELEVATING LIQUIDS AND SEMI-LIQUIDS
John P. Reeves, 4168 Marquis Way, Salt Lake City, Utah 84117
Filed Sept. 13, 1965, Ser. No. 486,903
10 Claims. (Cl. 103—72)

This invention relates to methods and apparatus for elevating liquids and semi-liquids, such as water and other low viscosity liquids, metallurgical slurries, freshly-mixed wet concrete, etc.

Endless belt conveyors utilizing belts having fingers projecting from their broad working faces, have long been used to elevate various granular and other dry materials, such as sand and agricultural debris. Thus, in U.S. Patent No. 810,510, issued January 23, 1906, to T. Robins, Jr., there is shown an endless belt of canvas or rubberized canvas for elevating loose granular materials, such as coal, ore, and broken rock. In U.S. Patent No. 2,428,852, issued October 14, 1947, to W. P. Muir et al. there is shown an endless belt conveyor for combing and elevating sand. In British Patent No. 640,143, published July 12, 1954, there is shown a somewhat similar type of belt conveyor for separating and elevating agricultural debris from potatoes. So far as I am aware, however, prior to the present invention there has not been any teachings of elevating or, in effect, pumping liquids or semi-liquids by means of a broad-surfaced, endless belt conveyor to avoid problems, such as corrosion and stoppage, encountered in the use of conventional pumps.

In accordance with the present method, even low viscosity liquids, such as water, can be raised vertically in surprisingly great volume and can be discharged as a continuously flowing stream.

Accordingly, a principal object of this invention is to provide a method of and a low-cost, durable apparatus for efficiently elevating liquids and semi-liquids through vertical or nearly vertical paths.

In carrying out the method of this invention, the liquid or semi-liquid material to be elevated is brought into engagement with the lower end of the working face of the belt of an endless belt conveyor, which belt is of special type for the purpose, and such material is elevated by driving the belt at a speed such that the frictional engagement of the working face of the belt with the material is sufficient to more than overcome the kinetic energy possessed by the material as it is lifted.

The preferred conveyor belt used to practice the method is constructed with fingers that protrude from the working face of the belt to form an acute angle in the direction of belt travel. The fingers are arranged to have broad faces that extend in side-by-side relationship across the belt, and are longitudinally staggered to define a plurality of continuous but devious channels extending endlessly with the belt. The fingers not only increase the coefficient of friction of the conveyor belt working surface, but, because of their angular relationship with the flat portion of the belt, they also prevent material falling away from the belt when it is being used to convey material vertically, or with a reverse angle such that the working run of the belt actually is below the return run. Although this is the preferred type of belt, any endless belt provided with projections on its working face that define a plurality of continuous but devious channels extending longitudinally of the belt can be used with more or less efficiency in practicing the method of the invention.

Endless and preferably continuous flanges project from the working face of the belt at opposite, lateral sides thereof to keep the liquid material being lifted from running off the belt at such lateral sides thereof. The flanges are specially tapered so that they do not hinder travel of the belt as it passes around head and tail rollers and so that they do not obstruct free discharge of material from the conveyor belt at the upper end of the conveyor.

There are shown in the accompanying drawing specific embodiments of the invention representing what are presently regarded as the best modes of carrying out the generic concepts in actual practice. From the detailed description of the method and presently preferred structural forms of this invention, other more specific objects and features will become apparent.

In the drawing:

FIG. 1 is a partially broken away perspective view of one form of the apparatus of the invention showing one method of loading the belt with material to be elevated, a center section being broken out for convenience of illustration;

FIG. 2, a fragmentary side elevation of the conveyor belt of FIG. 1 drawn to a larger scale;

FIG. 3, a fragmentary vertical section taken on the line 3—3 of FIG. 2 and drawn to an even larger scale;

FIG. 4, a fragmentary horizontal section taken on the line 4—4 of FIG. 2, drawn to the scale of FIG. 3;

FIG. 5, a view in side elevation of a form of the apparatus involving another way of loading material to be elevated onto the belt; and FIG. 6, still another view in side elevation of the conveyor of the invention, but showing how it can be used with a reverse angle of lift.

Referring now to the drawing:

In the embodiment illustrated in FIGURES 1–4, an endless conveyor belt, shown generally at 10, and having a working run 10a and a return run 10b, passes around an upper head pulley 11 and a lower tail pulley 12. The lower end of belt 10 is positioned in a trough 13, and another trough 14 is positioned adjacent the upper end of the belt to receive material discharged from the belt. The head and tail pulleys are journaled by side rails 15 and 16, which rest on the bottom of trough 13 and hold conveyor belt 10 spaced from the bottom and sides of the trough, so that it can be freely turned. Obviously, the side rails can be fixed to trough 13 to be positively held at any desired location, but in many instances the weight of the conveyor will alone be enough to hold it stable during operation.

The upper ends of side rails 15 and 16 rest against or are fixed to extensions 14a of the sides of trough 14, such that conveyor belt 10 is freely rotatable and the trough will receive material discharged centrifugally from the belt in the manner to be described.

A motor 17 is mounted on side rail 15 to drive the head roller 11 and, consequently, the belt 10.

The liquid material is carried on a working face 18, from which fingers 19 and flanges 20 and 21 extend. Each finger has a broad face 19a extending normal to the direction of belt travel to form an abutment that will increase the coefficient of friction of the belt.

The fingers 19 preferably form an angle of about sixty degrees with working face 18 in the direction of travel of the belt, and they are arranged in a side-by-side, but longitudinally staggered, pattern. Thus, continuous but devious channels are formed between the fingers, lengthwise of the belt.

The sixty degree angle between the fingers and the working face of the belt has been found highly suitable to prevent material falling from the belt when it is conveying vertically, as shown in FIG. 1, or at a reverse angle, as illustrated in FIG. 6. With this construction, the belt can be angled backwardly so that the working run is beneath the conveyor and forms an acute angle of 60° with the horizontal before any significant amount of material being conveyed will fall off the fingers and away from the belt. The belt will efficiently elevate liquids and semi-liquids at any angle within a 120° range, since the angled fingers will extend from the belt upwardly with respect to the horizontal and will direct falling material back toward the working surface of the belt.

The angle formed between the fingers and the working face cannot be so acute that the conveyed material becomes wedged between the fingers and the working face, so it can't be properly discharged as the belt passes over the head pulley. If the angle is too acute, the material may be carried past the head pulley and discharged at some point during the return run of the belt, rather than as the belt passes around the head pulley. This is especially true when the material being conveyed is a semi-liquid. Other angles between 90° and 60° can be chosen, but an acute angle is required to enable the conveyor to efficiently vertically lift liquids and semi-liquids, and the 60° angle has been found very satisfactory in that it insures the highly efficient operation of the conveyor through a maximum angular range.

The present invention does not operate on an entrapment principle, as does a conventional bucket lift. Rather, the material is raised by means of the fact that belt 10 is driven by motor 17 at a speed such that the frictional engagement of the belt with the material is greater than the kinetic energy of the material as it is elevated. During operation of the conveyor belt the flowable liquid or semi-liquid material being conveyed is constantly acted on by gravity and tends to fall back to the lower trough. Thus, the material tends to flow down the face of the conveyor belt, or, if the runs of the belt are vertical, or slanted to obtain a reverse angle of lift, the material tends to fall freely away from the belt. However, the material in falling hits the angled fingers, which then direct it back against the surface of the belt. If the belt is driven fast enough to create sufficient friction to overcome this effect of gravity, i.e. the kinetic energy of the material being lifted, the liquid or semi-liquid will travel upwardly at a rate depending upon the speed of travel of the belt, but at a rate slower than the speed of the belt.

The material divides and flows sideways as it comes into contact with each of the fingers. It will fall off the sides of the belt unless means are provided to direct it toward the center. Means for this purpose preferably take the form of upwardly extending, endless flanges 20 and 21 that protrude from opposite lateral sides of the working face 18 of the belt.

Flanges 20 and 21 are flexible. Each includes a straight outer surface 22, extending substantially normal to the working surface of belt 10, and an inner surface 23 inclined outwardly from the working face 18 so that the flanges have a tapered cross-section, with a relatively thick base, 20a and 21a, and a relatively thin outer edge, 20b and 21b.

As the belt travels around its head and tail pulleys, the flanges stretch, and, because of their cross-sectional configuration, they fold out from the belt in the manner illustrated in FIGS. 1 and 2. Thus, they do not hinder movement of the belt around the pulleys, nor do they obstruct discharge of material as the belt passes around the head pulley.

The relationship of the volume of water delivered to the belt speed and the angle of elevation has been shown by tests, the results of which are tabulated below:

| Belt Speed | Angle | Volume of Water Delivered |
|---|---|---|
| 16 RPM | 30° | 72 gal./min. |
| 16 RPM | 45° | 61.5 gal./min. |
| 16 RPM | 60° | 51.5 gal./min. |
| 21 RPM | 30° | 113 gal./min. |
| 21 RPM | 45° | 92 gal./min. |
| 21 RPM | 60° | 80 gal./min. |

In making the tests, the belt used was thirty-two feet long, the material conveyed was water, and the motor used to drive the belt was large enough (two horsepower, 220 volt, three phase) to maintain a constant belt speed, whether or not the belt was loaded. From the tabulated test results, it can readily be seen that increased belt speed is required to lift a desired volume of liquid when the angle of elevation is increased.

In many instances it may be desirable to place the lower end of the conveyor in the material to be lifted, whether in a trough as illustrated in FIGS. 1 and 6, a flowing stream, a reservoir, etc., but this is not necessary for satisfactory operation of the conveyor. As illustrated in FIG. 5, a feed hopper 24 or other feed structure may be used to supply material to the belt, since it is only necessary to direct material against the lower end of the working face thereof.

Also, as has been previously noted, the conveyor belt will effectively operate even if it is mounted at a reverse angle, such as that illustrated in FIG. 6. In this instance the working run of the belt is on the underside of the conveyor and extends upwardly from trough 13 to a receiving trough 14. However, should the working run 10a of the belt form a reverse angle of less than 60° with respect to the horizontal, fingers 19 will extend down from the belt with respect to the horizontal and will not deflect material back onto the working face. The conveyor will then lose much of its efficiency.

Although the drive motor for the conveyor belt of the invention has been illustrated and described as being an electric motor mounted on a side rail, it is realized that, for large and/or permanent lift constructions, other type motors and/or other motor mountings and drive connections between the motor and the conveyor belt may be preferred.

Whereas there are here illustrated and specifically described certain preferred constructions of apparatus which are presently regarded as the best modes of carrying out the invention, it should be understood that various changes may be made and other constructions adopted without departing from the inventive subject matter particularly pointed out and claimed herebelow.

I claim:
1. A method of elevating liquids and semi-liquids, comprising the steps of
feeding the material to be elevated onto the lower end of the working face of the belt of an upwardly-extending, endless, belt conveyor, said working face of which belt is provided, transversely thereof, with mutually spaced, longitudinally staggered, projections defining a plurality of continuous but devious channels extending endlessly with and superficially of said working face of the belt; and
driving said belt at a speed such that the resistance to flow of said material by reason of frictional engagement thereof with belt and belt projection surfaces is greater than the kinetic energy of the material as it is being elevated.

2. The method of elevating liquids and semi-liquids, comprising the steps of
placing the feed end of a belt-type conveyor in a material to be lifted, said conveyor including a belt having a working face with spaced fingers projecting therefrom;
raising the discharge end of said conveyor to the elevation at which the material is to be lifted; and
driving said belt at a speed such that the resistance to flow of the material created by the frictional resistance of the belt is greater than the kinetic energy of the material as it is elevated.

3. A conveyor for elevating liquids and semi-liquids, comprising an endless belt having a working run and a return run and having spaced fingers projecting from the working surface thereof and endless flanges extending upwardly from the working surface at opposite sides thereof, said flanges and said fingers being formed integrally with said belt and said flanges each having an outer face extending substantially normal to the working surface and an inner face inclined outwardly from said working surface, whereby said flanges have a relatively thick base portion and a relatively thin outer edge portion; a head pulley; a tail pulley, said belt being passed around the pulleys; and means for rotating one of said pulleys to drive the belt.

4. A conveyor according to claim 3, wherein the fingers each form an acute angle with the working surface of the belt, in the direction of travel of the belt.

5. A conveyor according to claim 4, wherein the acute angle is about 60°.

6. A conveyor for elevating liquids and semi-liquids, comprising an endless belt having spaced fingers projecting from the working surface thereof, said fingers being inclined in the direction of travel of the belt; endless flanges extending upwardly from the working surface at opposite sides thereof; and means for driving said belt.

7. A conveyor according to claim 6, wherein the angles formed between the inclined fingers and the working surface of the belt are each about 60°.

8. A conveyor according to claim 6, further including hopper means at the lower end of the belt, said hopper means having a discharge opening facing the working surface of the belt, whereby material placed in said hopper is discharged therefrom into engagement with the working face of the belt.

9. A conveyor according to claim 8, wherein the flanges each have an outer face extending substantially normal to the working surface of the belt and an inner face inclined outwardly from the working surface, whereby said flanges have a relatively thick base portion and a relatively thin outer edge portion.

10. A conveyor according to claim 3, wherein the working run of the belt is unsupported by rigid support structure intermediate the pulleys.

References Cited by the Examiner

UNITED STATES PATENTS 1,703,963   3/1929   Scruby _____ 103—72

FOREIGN PATENTS 557,146   5/1958   Canada.

ROBERT M. WALKER, *Primary Examiner*.

Notice of Adverse Decision in Interference

In Interference No. 96,489 involving Patent No. 3,306,218, J. P. Reeves, METHOD OF AND APPARATUS FOR ELEVATING LIQUIDS AND SEMI-LIQUIDS, final judgment adverse to the patentee was rendered Apr. 29, 1970, as to claim 1.

[*Official Gazette February 16, 1971*].